US009053884B2

(12) United States Patent
Lorenz et al.

(10) Patent No.: US 9,053,884 B2
(45) Date of Patent: Jun. 9, 2015

(54) SAFETY SWITCHING DEVICE WITH UNIVERSAL SIGNAL INPUT

(75) Inventors: Dirk Lorenz, Wetter (DE); Kevin Zomchek, Nashua, NH (US); Rudolf Papenbreer, Wuppertal (DE); Norbert Machuletz, Wetter (DE); Thomas Helpenstein, Grevenbroich (DE)

(73) Assignee: Rockwell Automation Germany GMBH & Co. KG, Wuppertal (DE)

( * ) Notice: Subject to any disclaimer, the term of this patent is extended or adjusted under 35 U.S.C. 154(b) by 446 days.

(21) Appl. No.: 13/031,414

(22) Filed: Feb. 21, 2011

(65) Prior Publication Data

US 2011/0204729 A1 Aug. 25, 2011

(30) Foreign Application Priority Data

Feb. 19, 2010 (EP) .................................... 10001716

(51) Int. Cl.
*H02H 11/00* (2006.01)
*H01H 47/00* (2006.01)

(52) U.S. Cl.
CPC .................................. *H01H 47/004* (2013.01)

(58) Field of Classification Search
CPC ..................................................... H02H 11/00
USPC ......................................................... 307/326
See application file for complete search history.

(56) References Cited

U.S. PATENT DOCUMENTS

| | | | | |
|---|---|---|---|---|
| 5,880,954 | A * | 3/1999 | Thomson et al. | 700/79 |
| 6,385,562 | B1 * | 5/2002 | Roth et al. | 702/188 |
| 6,486,674 | B2 * | 11/2002 | Groenewold et al. | 324/423 |
| 2002/0175568 | A1 * | 11/2002 | Clement et al. | 307/326 |
| 2008/0019069 | A1 * | 1/2008 | Meagher et al. | 361/93.9 |

FOREIGN PATENT DOCUMENTS

| | | | |
|---|---|---|---|
| DE | 102006027135 | B3 | 9/2007 |

OTHER PUBLICATIONS

Chinese Office Action Issued on Jan. 22, 2014 for Chinese Patent Application No. 201110042063.X—(6 Pages).

* cited by examiner

*Primary Examiner* — Rexford Barnie
*Assistant Examiner* — Joseph Inge
(74) *Attorney, Agent, or Firm* — Boyle Fredrickson, S.C.

(57) ABSTRACT

The present invention relates to a safety switching device for actuating actuators in a fail-safe manner, and further relates to an emergency shut-off circuit comprising a safety switching device according to the present invention. The safety switching device includes at least one first and second safety input for receiving a first and second input signal, at least one first and second safety output for transmitting a first and second output signal, and a control unit for evaluating said input signals and for generating said output signals. The first and second safety outputs further comprise a feedback loop said that couples the output signals back to the control unit such that the control unit is operable to perform a test routine for testing said output signals.

17 Claims, 5 Drawing Sheets

SAFETY SWITCHING DEVICE WITH UNIVERSAL SIGNAL INPUT

CROSS REFERENCE TO RELATED APPLICATIONS

This application claims priority to European Patent Application No. EP 10001716 filed on Feb. 19, 2010 and titled "Safety Switching Device With Universal Signal Input" and the disclosure of which is expressly incorporated herein.

BACKGROUND

The present invention relates to a safety switching device for actuating actuators in a fail-safe manner, and further relates to an emergency shut-off circuit comprising a safety switching device according to the present invention.

Safety switching devices and, in particular, safety relays are apparatuses intended to ensure the safety of humans working in the environment of an industrial process. Safety relays are for instance used to detect the opening of emergency stop switches or other machine lock-out switches, such as interlock switches guarding a gate or limit switches. Furthermore, safety relays are also used for processing the output signals of electro-sensitive protective equipment, such as light curtains or light grids.

Generally, all safety devices have to be designed to meet stringent requirements defined in worldwide adapted safety standards. These standards intend to achieve high reliability, which is achieved particularly by applying redundancy, diversity and monitoring principles. Safety relays, for example, provide internal checking or fault conditions, such as jammed, welded or stuck contacts of safety switches. Moreover, safety switches, such as limit switches, which already have redundant normally closed safety contacts for use with dual channel safety relays, are additionally provided with an auxiliary contact for status indication.

On the other hand, electro-sensitive protective equipment normally has so-called output signal switching devices, OSSDs, for generating an output signal to be connected to an input of the safety relay. These semiconductor outputs, which in the following will be referred as OSSDs, are provided as safety switching output of protective units, such as light grids or safety laser scanners. When the protective area is violated, the safety sensor switches the OSSDs into an OFF-state. Thus, the switching off of the machine or any endangering state is initiated. As this is generally known, each safety sensor has two parallel OSSD outputs, which are evaluated independently from each other in a two-channel modus. For instance, the terminal of an electro-sensitive protective equipment is connected to a safety relay or a safety controller according to category 3 of EN 954-1 (performance level d according to EN ISO 13849-1) via two OSSD outputs. The safety sensor transmits the status information "protective field free", which will be evaluated by the safety control device or safety relay.

When using the conventional safety switching devices 200 as shown in FIGS. 6 and 8, it has to be determined by changing the settings at a configuration unit 201, whether semiconductor outputs (OSSD) or emergency shut-off circuits, such as protective doors or the like, are to be coupled with the safety inputs S12, S22 of the switching device 200. This is due to the fact that the semiconductor outputs of the OSSDs perform an inherent self-test regarding any short-circuits between the respective leads. With electro-sensitive protective equipment 110, consequently, a safety input of a safety relay 200 only has to be equipped for performing a self-test of its own hardware.

As shown in FIG. 6, a conventional safety device 200 has a configuration unit 201, for instance, comprising a switch 204, which selects a different operational mode depending on whether the safety device 200 is connected to a light curtain 110, having OSSD semiconductor outputs, or is used within an emergency shut-off circuit, as this is shown in FIG. 8. In contrast to the present invention, a cross fault monitoring is provided either by the light curtain 110, or the input terminals S11, S22, when the configuration is set for the emergency stop operation. The safety relay 200 in the application environment of FIG. 6 expects a static 24 V signal at the input terminals.

On the other hand, when connecting the safety switching device 200 with a safety shut-off circuit, the safety switching device has the task of monitoring the input conductors with respect to any possible cross-circuiting. Known emergency shut-off circuits, for instance, use clocking signals which are transmitted within the emergency shut-off circuit, as this is for instance shown in FIGS. 8 and 9. In this conventional arrangement, the terminals S11 and S21 output clocking signals of directly opposed polarity which are transmitted to the safety inputs S12, S22 in an unchanged pattern, if no fault condition has occurred. This signal pattern is recognized by the safety device as a safe state.

However, the safety switching device 200 according to FIGS. 6 and 8 must either have configuration means for choosing the settings in accordance with the field of application, or must have a plurality of different inputs, each configured for a different kind of application. Such configuration, however, is costly and also enhances the expenditure for installing a safety system.

The present invention therefore aims at overcoming the above-identified problems. In particular, an object underlying the present invention is to provide a safety switching device and an emergency shut-off circuit, comprising such a safety device, which can be used universally within different safety circuits without the necessity of setting a different configuration depending on the respective application field.

SUMMARY OF THE INVENTION

The present invention is based on the idea that the clocking safety outputs S11 and S21 which form the output signal for an emergency shut-off circuit, output the same pulse pattern as a conventional OSSD signal. Consequently, the safety inputs S12, S22 always receive the same signal, irrespective of the kind of sensor that is connected with the inputs of the safety switching device. No changing of any settings is required.

According to the present invention, the safety outputs S11 and S21 are monitored with respect to their proper function because the input terminals do not perform any cross-circuiting monitoring.

According to the present invention, the safety outputs S11 and S21 are switched off for a short period, each at a different instant. The status of the safety output terminals S11 and S21 are fed back to the controller of the safety device. In case of a short-circuit or a contact to 24 Volts or 0 Volts, this fault condition is detected and the safety device switches the safety outputs into a predefined secure state.

To the accomplishment of the foregoing and related ends, certain illustrative aspects of the disclosed invention are described herein in connection with the following description and the annexed drawings. These aspects are indicative, however, of but a few of the various ways in which the principles disclosed herein can be employed, as it is intended to include all such aspects and their equivalents. Other advantages and novel features will become apparent from the following detailed description, when considered in conjunction with the drawings.

DETAILED DESCRIPTION OF THE PREFERRED EMBODIMENTS

Figure 1:
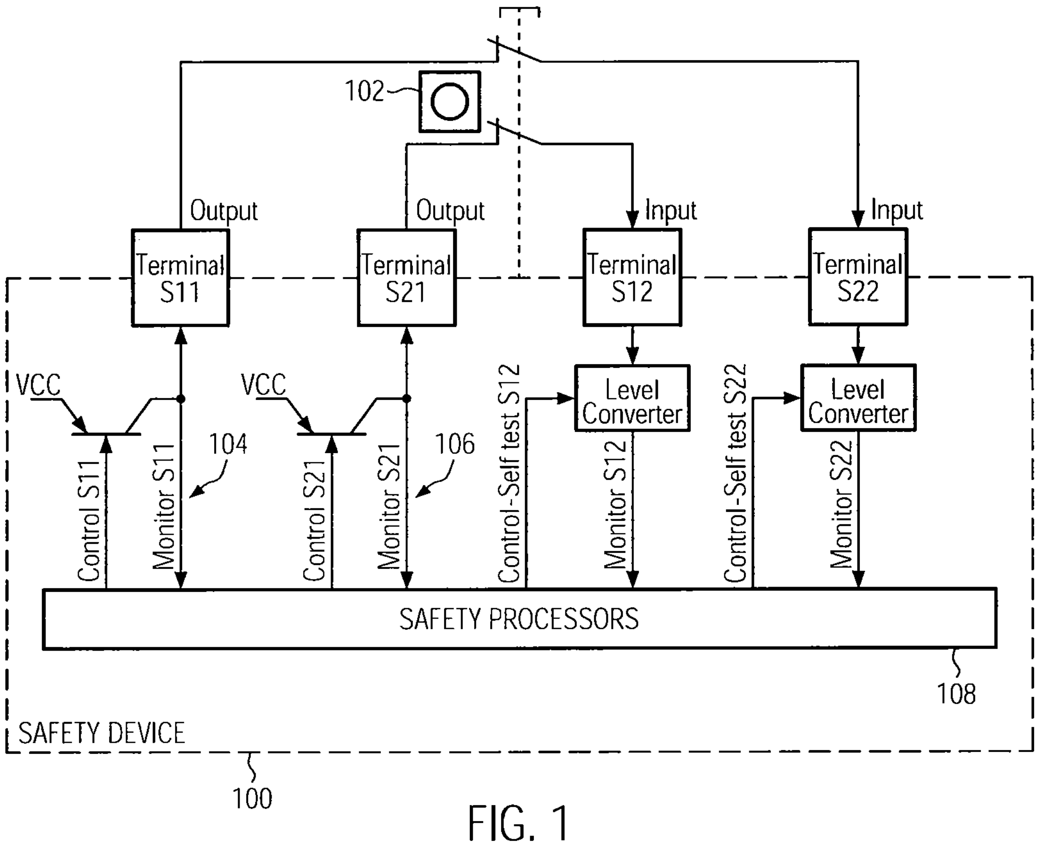
FIG. 1 shows a schematic diagram of a safety device according to the present invention, when applied in an emergency shut-off circuit.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component", "system", "equipment", "interface", "network" and/or the like are intended to refer to a computer related entity, either hardware a combination of hardware and software, software or software in execution. For example, a component can be, but is not limited to being, a process running on a processor, or a processor, a hard-disk drive, multiple storage drives (of optical and/or magnetic storage medium), an object, an executable, a thread of execution, a program and/or a computer, an industrial controller, a relay, a sensor and/or a variable frequency drive. By way of illustration, both an application running on a server and a server can be a component. One or more components can reside within a process and/or thread of execution, and a component can be localized on one computer and/or distributed between two or more computers.

In addition to the foregoing, it should be appreciated that the present invention can be implemented as a method, apparatus, or article of manufacture using typical programming and/or engineering techniques to produce software, firmware, hardware, or any suitable combination thereof to control a computing device, such as a variable frequency drive and controller, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the present invention.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a safety switching device 100 according to the present invention. In the particular arrangement of FIG. 1, the safety device 100 is connected with an emergency shut-off switch to form an emergency shut-off circuit. The emergency shut-off switch 102 comprises two sets of contacts which are mechanically linked for a dual channel operation of the safety device 100.

The safety device 100 is for instance a two-channel safety relay with four external terminals, S11, S12, S21 and S22, but may of course also have a large number of additional terminals, as this is well-known in the art.

Terminals S11 and S21 represent the safety signal outputs and terminals S12 and S22 are the signal inputs of the safety device 100 and serve to be connected to other safety devices, such as the emergency stop switch 102. The emergency stop switch 102 comprises two sets of normally closed contacts, which are mechanically linked to one another. The output terminal S11 is connected to +24 Volt DC and the output terminal S21 is connected to ground. Accordingly, both poles of a signal voltage of 24 Volts DC are available at the signal output terminals S11 and S21.

Figure 2:
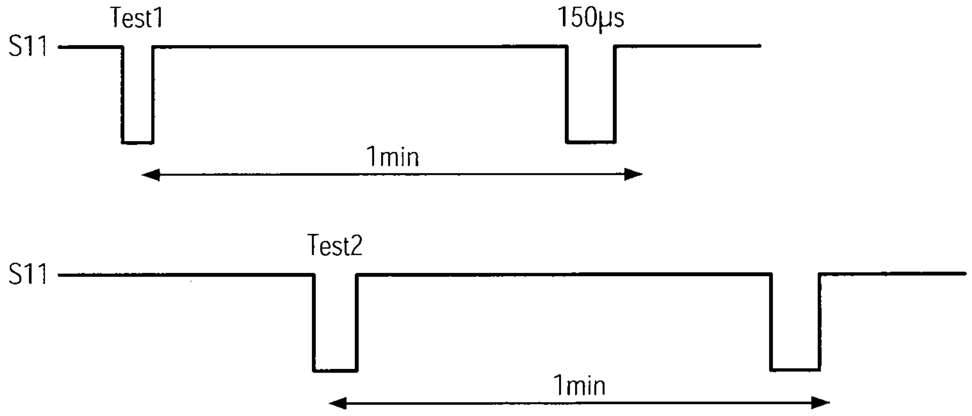
FIG. 2 shows a signal pattern at the output terminals of the safety device of FIG. 1.

The input terminal S12 is connected via the magnet coil of a first contactor (not shown) to ground and input terminal S22 is connected via the magnet coil of a second contactor (not shown) to +24 Volts DC. The two contactors are used to operate safety outputs (not shown) of the safety relay 100. In order to perform a cross fault monitoring in the circuit arrangement of FIG. 1, the output terminals S11 and S21 output a pulse train pattern as shown in FIG. 2, which is exactly the same as the one that is generated by the OSSD of an electro-sensitive protective equipment 110, for instance a light curtain.

In order to monitor the status of terminals S11 and S21, according to the present invention, a feedback connection 104, 106, is provided at each output. A control unit 108 comprising at least one safety processor evaluates the measured signals and generates corresponding output signals. In case of a cross fault or a short-circuiting towards 24 Volts or 0 Volt, this fault condition is detected and the control unit 108 assigns a safe value to the output signals.

On the other hand, the pulse trains transmitted by the outputs S11 and S21 are passed through the emergency shut-off switch 102 and are received unchanged at the input terminals S12, S22 for the case that neither a fault condition has occurred nor the emergency switch has been actuated. Otherwise, the safety device does not detect the expected values, when monitoring the signals at the terminals S12 and S22 and the control unit 108 of the safety device 100 initiates the safe status of the signals at the output terminals S11 and S21.

Of course, the control unit 108 will advantageously also be constructed in a redundant way, as this is known to a person skilled in the art. For instance, the control unit 108 comprises two safety processors which monitor each other's proper functioning. Furthermore, the safety device according to the present invention also can be used in connection with safety shut-down mats.

Figure 3:
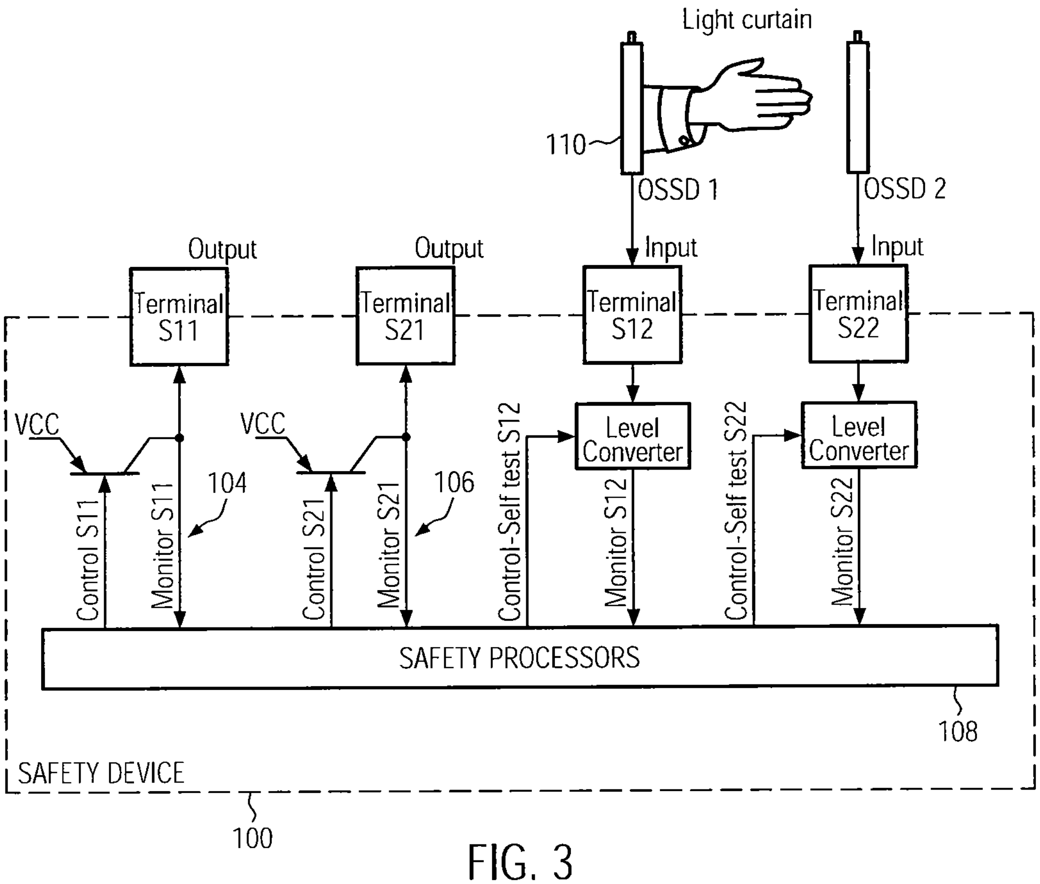
FIG. 3 shows a schematic diagram of the inventive safety device when being connected with a light curtain.
Figure 4:
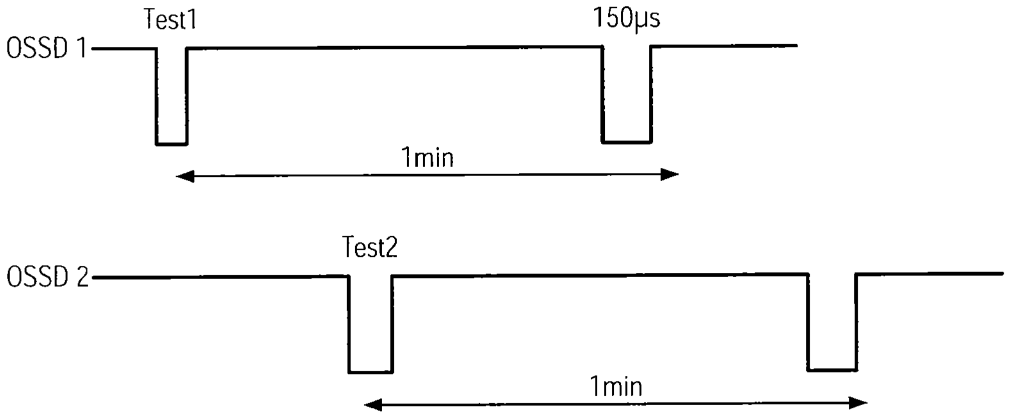
FIG. 4 shows the signals which are input from the light curtain to the safety input terminals of the safety device.

According to the present invention, the input terminals S12, S22 of the safety device 100 always expect an input signal as the one that is normally generated by the OSSDs of an electro-sensitive protective equipment 110. Thus, as shown in FIG. 3, the safety device according to the present invention can also be coupled to a light curtain 110, without changing any configurations. The input terminals S12, S22 again receive the same signal in this case, not from the output terminals S11 and S21 of the safety switching device, but from the semiconductor outputs of the light curtain 110, as this is shown in FIG. 4.

Figure 5:
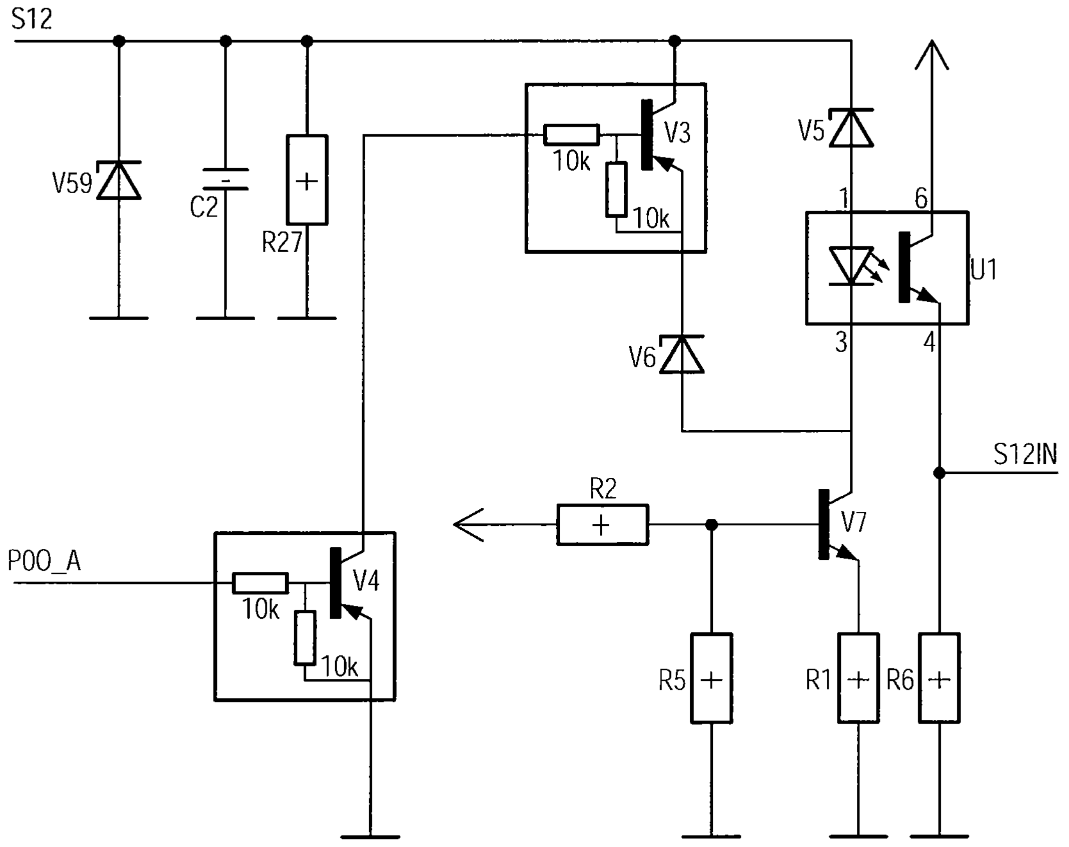
FIG. 5 shows a circuit diagram of a safety input.
Figure 6:
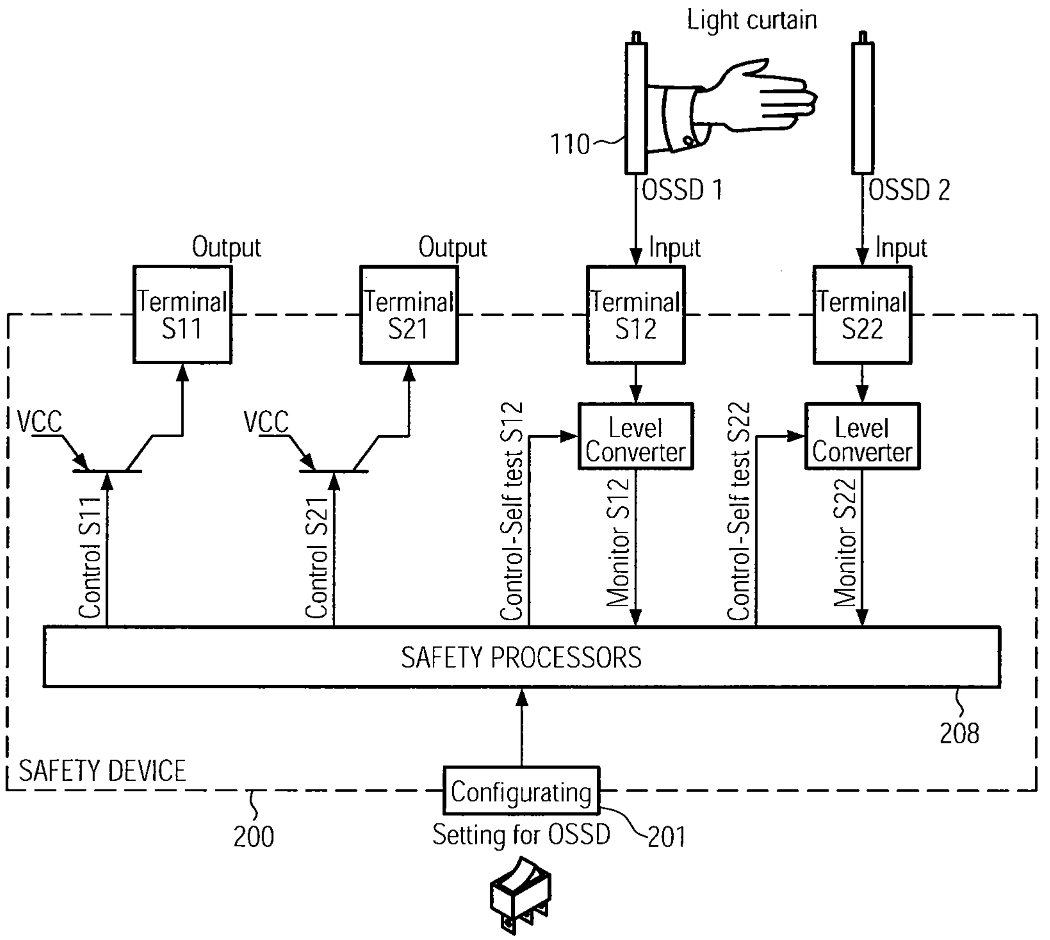
FIG. 6 (prior art)
FIG. 6 shows a schematic diagram of a known safety device, when being connected with a light curtain.
Figure 7:
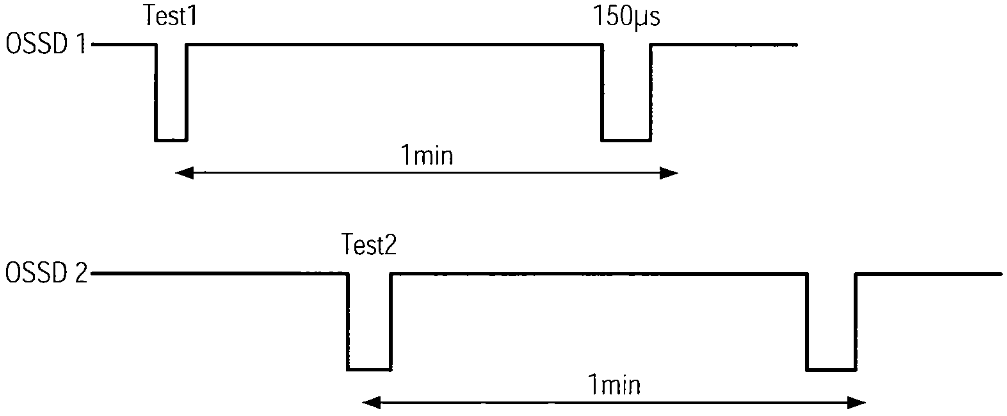
FIG. 7 (prior art)
FIG. 7 shows the signal output by the light curtain shown in FIG. 6.
Figure 8:
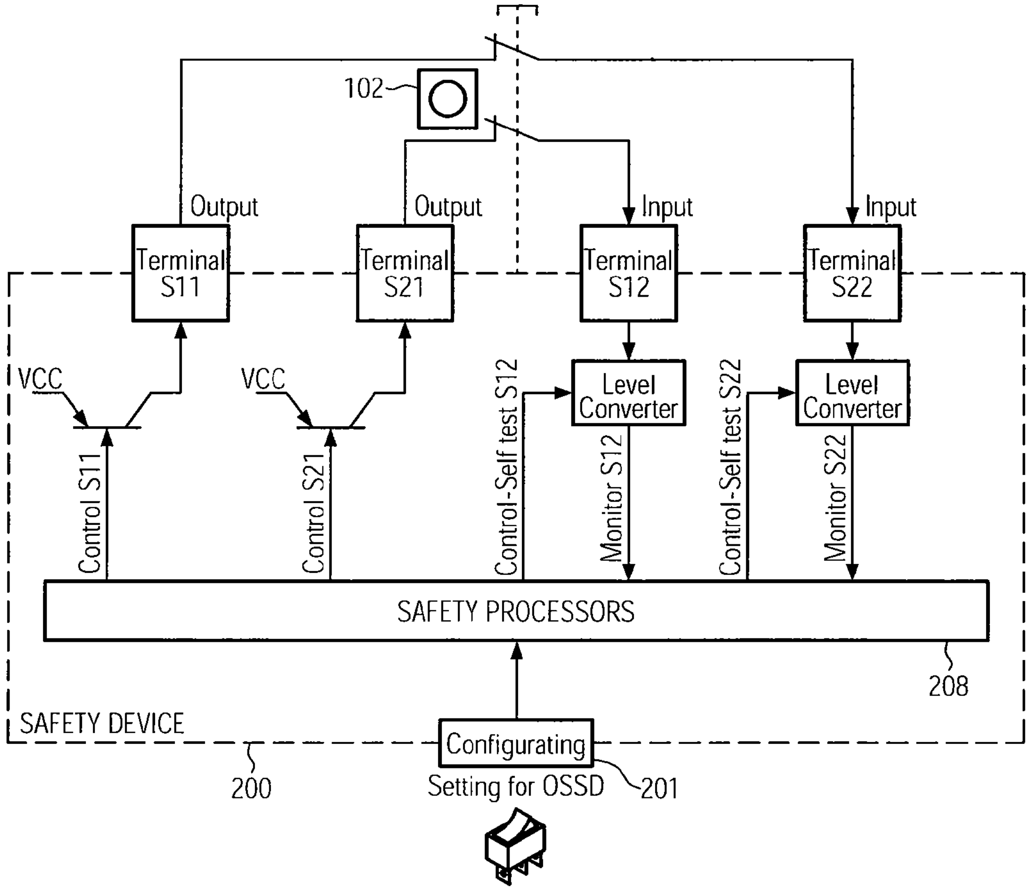
FIG. 8 (prior art)
FIG. 8 shows a schematic diagram of a known safety device, when being connected in an emergency shut-off circuit.
Figure 9:
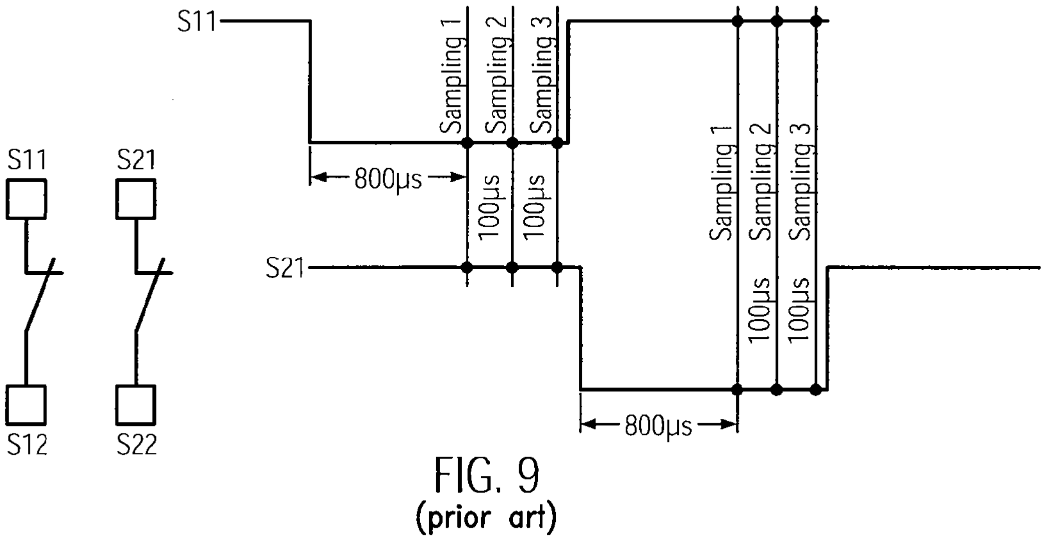
FIG. 9 (prior art)
FIG. 9 shows the clocked signals at the output terminals of the conventional safety device of FIG. 8.

FIG. 5 shows a circuit diagram of a safety signal input S12, which is able to switch off the input signal and test the hardware down to the safety processors 108.

By leaving the safety outputs or the safety device 100 at a 24 Volt static potential and by providing a regular testing with a pulse pattern for responding to conventional OSSD outputs, the safety device according to the present invention can be used for all signal generating devices, such as emergency shut-off circuits and electro-sensitive protective equipment as well as switching mats without the necessity of changing any configurations. The state of the outputs is monitored by the safety processors 108 and therefore a cross fault detection can be performed.

The invention claimed is:

1. A safety switching device for actuating actuators n a fail-safe manner, said safety switching device comprising:

at least one first and second safety input for receiving a first and second input signal;

at least one first and second safety output for transmitting a first and second output signal to a safety sensor;

at least one two-channel emergency stop switch which is connected between said safety inputs and said safety outputs, said switch being actuable between an open and a closed state;

a control unit for evaluating said input signals and for generating said output signals; and a first feedback loop that couples the at least one first safety output signal communicated to the at least one first safety output back to the control unit and a second feedback loop that couples the at least one second safety output signal communicated to the at least one second safety output back to the control unit, and wherein the control unit is operable to perform a test routine that includes switching off one of the output signals for a predetermined period or time for testing said output signals.

2. The safety switching device according to claim 1, wherein said output signals are generated to have a pattern coinciding with an output signal of an output signal switching device, OSSD, of an electro-sensitive protective equipment.

3. The safety switching device according to claim 1, wherein said first and second safety input are coupled with at least one level converting unit, and wherein the control unit is operable to perform a test routine for testing said input signals.

4. The safety switching device according to claim 1, wherein upon detection of one of a cross fault or a short circuit with 24 V or 0 V, said safety outputs are set to a safe state.

5. The safety switching device according to claim 1, wherein said control unit comprises at least two redundant microcontrollers that are adapted to monitor each other's functions.

6. An emergency shut-off circuit comprising:

a safety switching device having at least one first and second safety input for receiving a first and second input signal, at least one first and second safety output for transmitting a first and second output signal, and a control unit for evaluating said input signals and for generating said output signals;

at least one two-channel emergency stop switch which is connected between said safety inputs and said safety outputs, said switch being actuable between an open and a closed state;

two sets of normally closed contacts which are mechanically linked to one another and can be actuated to be brought into an opened state; and wherein said first and second safety outputs further each comprise a first feedback loop that is connected between each respective one of the at least one first safety output and the control unit and a second feedback loop that is connected between each respective one of the at least one second safety output and the control unit for coupling back said output signals delivered to each of the at least one first and second safety outputs to the control unit, and wherein the control unit is operable to perform a test routine for testing said output signals.

7. The emergency shut-off circuit according to claim 6, wherein said test routine comprises switching off one of the output signals for a predetermined period of time.

8. The emergency shut-off circuit according to claim 6, wherein said output signals are generated to have a pattern coinciding with an output signal of an output signal switching device (OSSD) of an electro-sensitive protective equipment.

9. The emergency shut-off circuit according to claim 6, wherein said first and second safety input are coupled with at least one level converting unit, and wherein the control unit is operable to perform a test routine for testing said input signals.

10. The emergency shut-off circuit according to claim 6, wherein upon detection of a cross fault or a short circuit with 24 V or 0 V said safety outputs are set to a safe state.

11. A safety switching device for actuating actuators in a fail-safe manner, said safety switching device comprising:

a control unit;

a first and a second input terminal for receiving a first and a second input signal, respectively;

a first and a second output terminal for transmitting a first and a second output signal that are generated by the control unit based on evaluation of the first and second input signals by the control unit to a safety sensor device and wherein the first and second output signals are generated to have a pattern coinciding with an output signal of an output switching signal device (OSSD) of an electro-sensitive protective equipment;

at least one two-channel emergency stop switch which is connected between said safety inputs and said safety outputs, said switch being actuable between an open and a closed state; and a first feedback loop that couples the first output terminal of the safety sensor device to the control unit and a second feedback loop that couples the second output terminal of the safety sensor device to the control unit such that the control unit can perform a test routine to assess an operating condition of the output terminals.

12. The safety switching device of claim 11 wherein the control unit does not cross-circuit monitor the first and the second input, terminals.

13. The safety switching device of claim 11 wherein the test routine further includes switching off the first and the second output terminal at different instances and the respective one of the first and second feedback loops communicates a condition of a respective one of the first and the second output terminals to the control unit during the test routine.

14. The safety switching device of claim 13 wherein the control unit switches the first and second output terminals to a predefined secure state is a short-circuit or a contact condition is detected during the test routine.

15. The safety switching device of claim 11 wherein the test routine includes switching off one of the first output terminal and the second output terminal for a predetermined interval.

16. The safety switching device of claim 11 wherein the first and second output signals are generated in a pattern that coincides with a pattern associated with activation of the electro-sensitive protective equipment.

17. The safety switching device of claim 11 wherein the control unit further comprises a first microcontroller adapted to monitor functioning of a second microcontroller and the second microcontroller is adapted to monitor functioning of the first microcontroller.

* * * * *

UNITED STATES PATENT AND TRADEMARK OFFICE

CERTIFICATE OF CORRECTION

PATENT NO. : 9,053,884 B2
APPLICATION NO. : 13/031414
DATED : June 9, 2015
INVENTOR(S) : Lorenz et al.

It is certified that error appears in the above-identified patent and that said Letters Patent is hereby corrected as shown below:

IN CLAIM 1:
(Col. 5, line 62) After the term “actuators”, delete “n” and insert --in--
(Col. 6, line 16) After the term “period”, delete “or” and insert --of--

IN CLAIM 12:
(Col. 8, line 3) After “input”, delete “,”

Signed and Sealed this
Sixth Day of October, 2015

Michelle K. Lee
*Director of the United States Patent and Trademark Office*